(12) United States Patent
Losi et al.

(10) Patent No.: US 8,104,523 B2
(45) Date of Patent: Jan. 31, 2012

(54) PNEUMATIC TIRE AND PROCESS FOR ITS MANUFACTURE

(75) Inventors: Piero Losi, Milan (IT); Pierluigi De Cancellis, Milan (IT); Gaetano Lo Presti, Milan (IT); Rodolfo Noto, Milan (IT); Claudio Lacagnina, Milan (IT)

(73) Assignee: Pirelli Pneumatici S.p.A., Milano (IT)

( * ) Notice: Subject to any disclaimer, the term of this patent is extended or adjusted under 35 U.S.C. 154(b) by 256 days.

(21) Appl. No.: 10/584,798

(22) PCT Filed: Dec. 30, 2003

(86) PCT No.: PCT/IT03/00867
§ 371 (c)(1),
(2), (4) Date: Apr. 18, 2007

(87) PCT Pub. No.: WO2005/063509
PCT Pub. Date: Jul. 14, 2005

(65) Prior Publication Data
US 2007/0187013 A1    Aug. 16, 2007

(51) Int. Cl.
*B60C 11/00* (2006.01)
*B60C 11/03* (2006.01)
(52) U.S. Cl. ............ 152/209.1; 152/209.4; 152/209.5
(58) Field of Classification Search .......... 152/209.1, 152/209.4, 209.5
See application file for complete search history.

(56) References Cited

U.S. PATENT DOCUMENTS

| | | | |
|---|---|---|---|
| 3,773,096 A * | 11/1973 | Masson ............... | 152/209.4 |
| 5,937,926 A | 8/1999 | Powell | |
| 6,523,585 B1 | 2/2003 | Ducci et al. | |
| 6,635,132 B2 * | 10/2003 | Caretta et al. ............ | 156/111 |

FOREIGN PATENT DOCUMENTS

| EP | 0 839 675 A1 | 5/1998 |
|---|---|---|
| EP | 0847880 * | 5/1998 |

(Continued)

OTHER PUBLICATIONS

Office Action issued by Japan Patent Office in corresponding Patent Application No. JP 2005-512779 on May 18, 2010 (3 pages).

(Continued)

*Primary Examiner* — Justin Fischer
(74) *Attorney, Agent, or Firm* — Finnegan, Henderson, Farabow, Garrett & Dunner, L.L.P.

(57) ABSTRACT

A pneumatic tire has a carcass structure having at least one carcass ply and at least one annual reinforcing structure associated with the carcass ply, a tread band made of an elastomeric material at a radially outer position with respect to the carcass structure, a belt structure interposed between the carcass structure and the tread band and a pair of axially opposite side walls on the carcass structure, wherein the tread band has i) at least one first sector, radially extending, substantially of a first elastomeric material; ii) a plurality of second sectors radially extending, positioned at axially opposite sides of the at least one first sector and substantially of a second elastomeric material; iii) at least one longitudinal groove formed in the at least one first sector and extending substantially for the entire circumferential development of the tread band, wherein the first elastomeric material has a modulus of elasticity under compression at 23° C. greater than the modulus of elasticity under compression at 23° C. of the second elastomeric material, and wherein the modulus of elasticity under compression at 23° C. of the first elastomeric material is about 20 to about 80 MPa.

80 Claims, 5 Drawing Sheets

FOREIGN PATENT DOCUMENTS

| | | | |
|---|---|---|---|
| EP | 1 095 795 A1 | | 5/2001 |
| JP | 53-080602 | | 7/1978 |
| JP | 53080602 | * | 7/1978 |
| JP | 02-249707 | | 10/1990 |
| JP | 02249707 | * | 10/1990 |
| JP | 4-185507 | | 7/1992 |
| JP | 7-108805 | | 4/1995 |
| JP | 2000-079643 | | 3/2000 |
| JP | 2000-118212 | * | 4/2000 |
| JP | 2001-206013 | | 7/2001 |
| JP | 2002-046194 | | 2/2002 |
| JP | 2002-52906 | * | 2/2002 |
| JP | 2003-527268 | | 9/2003 |
| JP | 2003-320804 | * | 11/2003 |
| WO | WO 00/35666 | | 6/2000 |
| WO | WO 01/03954 | | 1/2001 |

OTHER PUBLICATIONS

English-language translation of Office Action issued by Japan Patent Office in corresponding Patent Application No. JP 2005-512779 on May 18, 2010 (4 pages).

Office Action Issued by Japan Patent Office in Corresponding Japanese Patent Application No. JP-2005-512779 on Oct. 21, 2009.

Englis Language Translation of Office Action Issued by Japan Patent Office in Corresponding Japanese Patent Application No. JP-2005-512779 on Oct. 21, 2009.

* cited by examiner

PNEUMATIC TIRE AND PROCESS FOR ITS MANUFACTURE

CROSS REFERENCE TO RELATED APPLICATION

This application is a national phase application based on PCT/IT2003/000867, filed Dec. 30, 2003, the content of which is incorporated herein by reference.

BACKGROUND OF THE INVENTION

The present invention refers to a pneumatic tire for two-wheeled or four-wheeled vehicles and in particular, but not exclusively, to a pneumatic tire for motorvehicles.

Specifically, the present invention refers to a pneumatic tire comprising a carcass structure having at least one carcass ply, and at least one annular reinforcing structure associated to the carcass ply, a tread band made of an elastomeric material at a radially outer position with respect to the carcass structure, a belt structure interposed between the carcass structure and the tread band and a pair of axially opposite sidewalls on the carcass structure, wherein the tread band is of the type comprising a plurality of radially extending and axially adjacent sectors.

PRIOR ART

In the field of pneumatic tires for vehicles one of the most felt needs is that of ensuring a suitable drainage of water or mud present under the ground contacting area of the pneumatic tire on wet road or ground. The ability to effectively drain the water under the ground contacting area of the pneumatic tire, in fact, considerably influences the road holding on wet ground of the latter with clear effects on travel safety.

In pneumatic tires this draining action is often carried out by one or more longitudinal grooves formed in the tread band and extending substantially for the entire circumferential development thereof.

In known pneumatic tires, however, the actual draining capacity of these longitudinal grooves during the pneumatic tire rolling is lower than the theoretical capacity expected on the basis of the geometrical configuration of the grooves. When the pneumatic tire gets in touch with the ground, in fact, the side walls of these grooves undergo an elastic deformation due to the weight acting on the pneumatic tire itself, an elastic deformation which tends to reduce the cross section of the grooves under the ground contacting area of the pneumatic tire and, therefore, the useful section actually able to drain water, with respect to the cross section of the grooves at rest.

This negative phenomenon tends, among other things, to worsen with the gradual wear of the tread band due to the tapering along the radially inward direction of the longitudinal grooves which already tends per se to reduce the cross section of the grooves, with a corresponding further progressive reduction of the actual draining capacity of the pneumatic tire and of the road holding on wet ground of the pneumatic tire.

Although documents are known that describe pneumatic tires provided with a tread band comprising a plurality of axially adjacent sectors, like for example Japanese patent applications published with nos. JP 07-108805 and JP 04-185507 or U.S. Pat. No. 6,523,585, none of them tackles this specific problem, let alone offers satisfactory solutions to solve the same.

PROBLEM UNDERLYING THE INVENTION

The present invention has the object of providing a pneumatic tire provided with a tread band comprising a plurality of axially adjacent sectors and with at least one longitudinal groove, having improved draining capacity and better road holding while running on wet ground.

SUMMARY OF THE INVENTION

According to a first aspect of the invention, this object is achieved by a pneumatic tire as defined in the attached claim 1.

In particular, the Applicant has found that thanks to a particular combination of a specific tread band design and specific mechanical characteristics of the axially adjacent sectors of the tread band it is possible to obtain a pneumatic tire structure that is able to keep the cross section of the longitudinal grooves formed in the tread band substantially unchanged while the tire is running and, along therewith, that is able to give an actual draining capacity substantially equal to the theoretical draining capacity expected on the basis of the cross section of the longitudinal grooves at rest.

More specifically, the Applicant has found that the aforementioned object can be achieved by a pneumatic tire provided with a tread band comprising:

i) at least one first sector, radially extending, substantially consisting of a first elastomeric material;

ii) a plurality of second sectors, radially extending, positioned at axially opposite sides of said at least one first sector and substantially consisting of a second elastomeric material;

iii) at least one longitudinal groove formed in said at least one first sector and extending substantially for the entire circumferential development of the tread band;

wherein said first elastomeric material has a modulus of elasticity E' under compression at 23° C. greater than the modulus of elasticity E' under compression at 23° C. of said second elastomeric material, and wherein the modulus of elasticity E' under compression at 23° C. of said first elastomeric material is comprised between about 20 and about 80 MPa.

It should be specified herein that in the present description and in the subsequent claims, the term "elastomeric material" is used to indicate a composition comprising at least one elastomeric polymer and at least one reinforcing filler, such as carbon black and/or silica. Preferably, such a composition also comprises additives such as, for example, a cross-linking agent and/or a plasticizer. Thanks to the presence of the cross-linking agent, such a material may be cross-linked by heating so as to form the end product.

In the present description and in the subsequent claims, moreover, the values of the modulus of elasticity E' under compression are intended to be measured by means of conventional apparatuses by submitting a cylindrical test piece of vulcanized elastomeric material having a length of 25 mm and a diameter of 14 mm, subjected to compression preloading up to a longitudinal deformation of 25% of its original height and kept at a temperature of 23° C., to a dynamic sinusoidal deformation of a maximum width of ±3.50% of the height under preloading, with a frequency of 100 cycles per second (100 Hz).

The Applicant, while not wishing to be bound by any interpretative theory, observes that by forming the longitudinal groove or grooves at radially extending sectors of the tread band consisting of an elastomeric material having the aforementioned characteristics of modulus of elasticity E' under compression accounting, as such, for high rigidity characteristics, it is possible to reduce the amount of the deformation undergone by the side walls of these grooves to virtually negligible values when the tread band gets in touch with the ground.

Thanks to such a feature, the pneumatic tire of the invention thus achieves an improved water draining action and an improved behavior on wet ground with respect to known pneumatic tires of the same type and this in all wear conditions of the tread band to the great advantage of driving safety.

Preferably, the first elastomeric material has a modulus of elasticity (E') under compression at 23° C. comprised between about 30 and about 50 MPa.

By observing the aforementioned values of the modulus of elasticity under compression E' at 23° C. of the first elastomeric material, it has been found that it is advantageously possible to achieve an optimal rigidity of the side walls of the longitudinal groove(s) so as to keep substantially constant the cross section thereof (the water draining one) when the tread band gets in touch with the ground.

Preferably, the second elastomeric material has a modulus of elasticity (E') under compression at 23° C. comprised between about 4 and about 15 MPa and, still more preferably, between about 7 and about 12 MPa.

By observing the aforementioned values of the modulus of elasticity under compression E' at 23° C. of the second elastomeric material, it has been found that it is advantageously possible to achieve an optimal performance of the pneumatic tire in terms of driving behavior both on dry and wet grounds.

For the purposes of the invention, the axially adjacent sectors of the tread band can be obtained by forming and vulcanizing suitable elastomeric materials the composition of which can be easily determined by a man skilled in the art so as to achieve the desired values of the module of elasticity under compression.

In a preferred embodiment of the invention, the ratio between the modulus of elasticity E' under compression at 23° C. of the first elastomeric material and the modulus of elasticity E' under compression at 23° C. of the second elastomeric material of the tread band is not lower than about 1.30.

More preferably, the ratio between the modulus of elasticity E' under compression at 23° C. of the first elastomeric material and the modulus of elasticity E' under compression at 23° C. of the second elastomeric material of the tread band is comprised between about 1.5 and about 20 and, still more preferably, is comprised between about 2.3 and about 7.

Also in this case, it has been noted that by observing such ratios it is advantageously possible to achieve an optimal performance of the pneumatic tire in terms of water draining capacity under the ground contacting area and in terms of road holding.

Preferably, the IRHD hardness at 23° C. of the first elastomeric material, measured according to standard ISO 48, is comprised between about 75 and about 95 and, still more preferably, is comprised between about 80 and about 90.

Advantageously, this preferred feature allows to achieve an optimal rigidity of the side walls of the longitudinal groove(s) so as to keep substantially constant the cross section of the latter (the water draining one) when the tread band gets in touch with the ground.

Preferably the IRHD hardness at 23° C. of the second elastomeric material, measured according to standard ISO 48, is comprised between about 35 and about 80 and, still more preferably, is comprised between about 45 and about 75.

By observing the aforementioned hardness values of the second elastomeric material, it has been found that it is advantageously possible to achieve an optimal performance of the pneumatic tire in terms of driving behavior both on dry and wet grounds.

In a preferred embodiment of the invention, the ratio between the IRHD hardness at 23° C. of the first elastomeric material, measured according to standard ISO 48, and the IRHD hardness at 23° C. of the second elastomeric material, measured according to standard ISO 48, is not lower than about 1.10.

More preferably, the ratio between the IRHD hardness at 23° C. of the first elastomeric material, measured according to standard ISO 48, and the IRHD hardness at 23° C. of the second elastomeric material, measured according to standard ISO 48, is comprised between about 1.15 and about 2.70.

In such a way, it has advantageously been possible to achieve an optimal compromise between a sufficient rigidity of the side walls of the longitudinal groove(s) and, therefore, the draining capacity of the pneumatic tire and the performance of the latter in terms of driving behavior both on dry and wet grounds.

In a preferred embodiment of the invention, the tread band is provided with a plurality of longitudinal grooves for draining water from the ground contacting area of the pneumatic tire formed in respective first sectors, radially extending and axially spaced apart, substantially consisting of said first elastomeric material.

The arrangement and the number of the longitudinal grooves and of the respective sectors in which they are formed can be easily determined by the man skilled in the art according to specific application requirements. Thus, for example, the longitudinal grooves may or may not be axially spaced apart with a constant pitch between one another according to the characteristics that one wishes to give to the tread pattern.

In a preferred embodiment of the invention, the aforementioned at least one first sector is radially extending substantially for the entire thickness of the tread band, so as to achieve the desired technical effect of maintaining the characteristics of transversal rigidity and shape of the transversal grooves substantially for the entire useful life of the pneumatic tire.

In an alternative preferred embodiment of the invention, the pneumatic tire can also be provided with a layer of a suitable elastomeric material interposed between the tread band and the belt structure.

In such a way, it is advantageously possible—if needed—to optimize specific characteristics of the pneumatic tire such as for example the transversal rigidity or the rolling resistance.

Within the framework of this embodiment of the invention, this layer may be substantially consisting of the first elastomeric material.

In this way, the first sectors form a single body with this radially inner layer from which they extend along a radially outer direction. Advantageously, this preferred embodiment allows to compensate the modulus of elasticity of the second elastomeric material with an underlayer having a modulus of elasticity greater than that of the second elastomeric material (the one mainly in contact with the road surface), achieving a global rigidity of the tread both along the longitudinal and the transversal directions adapted to optimize the performances of the tire such as the driving behavior.

Still within the framework of this embodiment of the invention, this layer may be substantially consisting of the second elastomeric material.

In this way, it is advantageously possible to achieve a reduction of the global rigidity of the tread band (with respect to the previous situation or to the situation in which the aforementioned layer is absent), both along the longitudinal and the transversal directions, adapted to optimize the performances of the tire such as the driving behavior.

Preferably, the layer interposed between the tread band and the belt structure has a thickness comprised between 1 and 5 mm so as to be able to fully achieve the aforementioned technical effects.

In a preferred embodiment, the width of the aforementioned at least one first radial sector is at least equal to the width of the longitudinal groove formed therein. In such a way, it is advantageously possible to achieve the technical effect of keeping unchanged the cross section of the groove when the tread band gets in touch with the ground.

Preferably, the difference between the width of said at least one first radial sector and the width of said at least one longitudinal groove is comprised between 4 and 10 mm. In such a way, it is advantageously possible to have, on both sides of the groove, a more than adequate quantity of the first elastomeric material to avoid undesired deformations of the side walls of the grooves under the ground contacting area of the pneumatic tire when the tread band gets in touch with the ground.

In a preferred embodiment, the axially opposite side walls of the longitudinal groove(s) formed in the first sectors of the tread band are tapered along a radially inner direction and are substantially rectilinear.

Preferably, moreover, the aforementioned at least one longitudinal groove is positioned astride the median plane of the respective radially extending first sector for reasons of symmetry and so as to achieve substantially the same characteristics of rigidity of the axially opposite side walls of the groove itself.

According to a further aspect of the invention, a process for building a pneumatic tire is provided as defined in the attached claim 19.

Such a process comprises, in particular, the steps of:
a) building a carcass structure having at least one carcass ply associated to at least one annular reinforcing structure;
b) assembling a belt structure;
c) arranging, at a radially outer position with respect to said belt structure, at least one radially extending first sector of a tread band substantially consisting of a first elastomeric material having, after vulcanization, a value of the modulus of elasticity E' under compression at 23° C. comprised between about 20 and about 80 MPa;
d) arranging, at a radially outer position with respect to said belt structure, a plurality of radially extending second sectors of the tread band, axially spaced apart and substantially consisting of a second elastomeric material having, after vulcanization, a value of the modulus of elasticity E' under compression at 23° C. lower than the modulus of elasticity E' under compression at 23° C. of said first elastomeric material;
wherein said steps c) and d) are carried out in such a way that said second sectors are positioned at axially opposite sides of said at least one first sector.

BRIEF DESCRIPTION OF THE DRAWINGS

Additional features and advantages of the invention will be better apparent from the following description of some preferred embodiments of pneumatic tires and of processes for their manufacture according to the invention, which description is made by way of non limiting indication, with reference to the attached drawings, wherein.

DETAILED DESCRIPTION OF THE PREFERRED EMBODIMENTS

Figure 1:
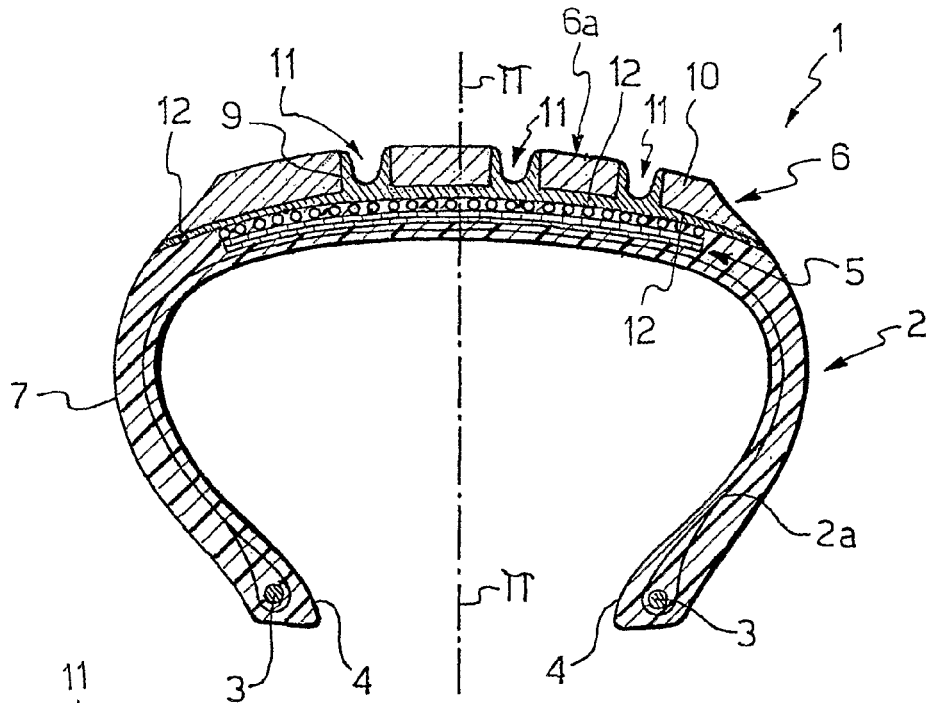
FIG. 1 shows a cross-section view of a first embodiment of a pneumatic tire according to the present invention.
Figure 2A:
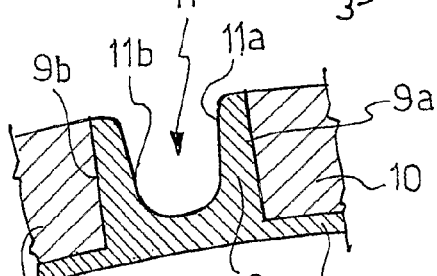
FIG. 2A shows a further enlarged scale cross-section view of a radially extending sector and of a longitudinal groove formed therein of the tread band of the pneumatic tire of FIG. 1.
Figure 2:
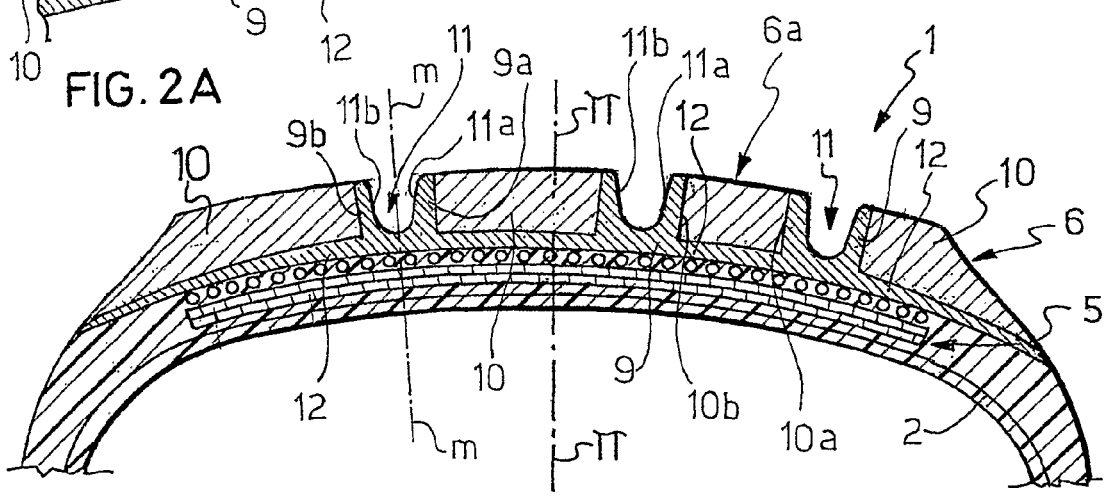
FIG. 2 shows an enlarged scale cross-section view of some details of the pneumatic tire of FIG. 1.

With reference to FIGS. 1-2, a pneumatic tire made according to a first preferred embodiment of the invention, which in the specific example is intended to equip a motorvehicle, is generally indicated at 1.

The pneumatic tire 1 comprises a carcass structure 2 provided with at least one carcass ply 2a the opposite side edges of which are externally folded up around respective annular reinforcing structures 3, usually known as "bead cores", each enclosed in a bead 4 defined along an inner circumferential edge of the pneumatic tire 1 and at which the pneumatic tire itself engages on a rim (not illustrated) forming part of the wheel of a vehicle.

The pneumatic tire 1 also comprises a tread band 6 made of an elastomeric material at a radially outer position with respect to the carcass structure 2, a belt structure 5 interposed between the carcass structure 2 and the tread band 6 and a pair of sidewalls 7, 8 at axially opposite positions on the carcass structure 2.

Preferably, the belt structure 5 includes one or more belt layers made for example with a fabric of metal cords or wires embedded in a rubber sheet, arranged parallel to each other in each layer and crossed with respect to those of the adjacent layer and with one or more so-called 0° cords spirally and coaxially wound on the pneumatic tire 1 at a radially outer position with respect to the crossed cord fabrics.

According to the embodiment illustrated in FIG. 1, the tread band 6 circumferentially applied around the belt structure 5 comprises a plurality of first sectors 9 axially spaced apart and radially extending in the tread band and a plurality of second sectors 10, axially spaced apart and also radially extending from axially opposite sides of the first sectors 9.

The tread band 6 thus made is provided with a radially outer surface 6a adapted for a rolling contact with the ground and provided with a tread pattern comprising a plurality of longitudinal grooves 11 for draining water or mud from the ground contacting area of the pneumatic tire 1, which longitudinal grooves 11 define a plurality of ribs and/or blocks.

Each longitudinal groove 11 is in turn provided with a pair of axially opposite side walls 11a, 11b preferably tapered along a radially inner direction.

Preferably, the side walls 11a, 11b of the longitudinal grooves 11 are also substantially rectilinear.

According to a feature of the invention, the longitudinal grooves 11 are formed in the first sectors 9 which substantially consist of a first elastomeric material having a modulus of elasticity E' under compression at 23° C. greater than the modulus of elasticity E' under compression at 23° C. of the elastomeric material constituting the second sectors 10.

Preferably, the longitudinal grooves 11 are positioned astride the median plane m of the first sectors 9.

According to the invention and in order to achieve adequate characteristics of rigidity and resistance to elastic deformation of the side walls 11a, 11b of the grooves 11, the first elastomeric material which constitutes the first sectors 9 of the tread band 6 has a modulus of elasticity E' under compression at 23° C. comprised between about 20 and about 80 MPa.

In such a way, it is advantageously possible to achieve the desired technical effect of keeping the cross section of the groove 11 unchanged when the tread band 6 gets in touch with the ground.

Preferably, the difference between the width of the first radial sectors 9 and the width of the longitudinal grooves 11 is comprised between 4 and 10 mm, so as to have, on both sides of the groove 11, a more than adequate quantity of elastomeric material to avoid undesired deformations of the side walls 11a, 11b of the longitudinal grooves 11 under the ground contacting area of the pneumatic tire 1 when the tread band 6 gets in touch with the ground.

More preferably, the first elastomeric material which constitutes the first sectors 9 of the tread band 6 has a modulus of elasticity E' under compression at 23° C. comprised between about 30 and about 50 MPa.

Preferably, the second sectors 10 substantially consist of a second elastomeric material having a modulus of elasticity E' under compression at 23° C. comprised between about 4 and about 15 MPa and, still more preferably, between about 7 and about 12 MPa.

Preferably, the elastomeric materials of the first and second sectors 9, 10 are chosen so that the ratio between the modulus of elasticity E' under compression at 23° C. of the first elastomeric material and the modulus of elasticity E' under compression at 23° C. of the second elastomeric material of the tread band is not lower than about 1.30.

More preferably, the ratio between the modulus of elasticity E' under compression at 23° C. of the first elastomeric material and the modulus of elasticity E' under compression at 23° C. of the second elastomeric material of the tread band is comprised between about 1.5 and about 20 and, still more preferably, is comprised between about 2.3 and about 7.

Preferably, the IRHD hardness at 23° C. of the first elastomeric material, measured according to standard ISO 48, is comprised between about 75 and about 95 and, still more preferably, is comprised between about 80 and about 90.

Preferably, the IRHD hardness at 23° C. of the second elastomeric material, measured according to standard ISO 48, is comprised between about 35 and about 80 and, still more preferably, is comprised between about 45 and about 75.

In a preferred embodiment of the invention, the ratio between the IRHD hardness at 23° C. of the first elastomeric material, measured according to standard ISO 48, and the IRHD hardness at 23° C. of the second elastomeric material, measured according to standard ISO 48, is not lower than about 1.10.

More preferably, the ratio between the IRHD hardness at 23° C. of the first elastomeric material, measured according to standard ISO 48, and the IRHD hardness at 23° C. of the second elastomeric material, measured according to standard ISO 48, is comprised between about 1.15 and about 2.70.

In such a way, the first and second axially adjacent sectors 9, 10 of the tread band 6 advantageously allow, thanks to their different mechanical characteristics, to keep substantially constant the cross section of the longitudinal grooves 11 when the radially outer surface 6a of the tread band 6 gets in rolling contact with the ground.

Advantageously, this feature thus allows to have a better draining capacity of the pneumatic tire 1 with respect to that which is possible to achieve with pneumatic tires provided with a known tread band.

In the preferred embodiment illustrated in FIGS. 1, 2 and 2A, the first sectors 9 of the tread band 6 are extending along a radially outer direction starting from a layer 12 interposed between the tread band 6 and the belt structure 5.

Preferably, the layer 12 has a thickness comprised between 1 and 5 mm.

More preferably, the layer 12 is substantially constituted by the first elastomeric material and the first sectors 9 are integrally extending from such a layer along a radially outer direction. In such a way, the layer 12 carries out an advantageous supporting action of the first sectors 9 further increasing their characteristics of rigidity and deformation resistance.

For the purposes of the invention, the shape of the first and second sectors 9, 10 of the tread band 6 is not critical and can advantageously be chosen by a man skilled in the art according to specific application requirements. Thus, for example, such sectors can have a cross section that is substantially rectangular or, alternatively, substantially trapezoidal.

Equally not critical for the purposes of the invention is the shape of the axially opposite side walls 9a, 9b and 10a, 10b of the first and second sectors 9, 10 of the tread band 6.

Such walls can, for example, be substantially rectilinear or, alternatively, can be provided with at least one substantially curvilinear portion.

Also among these different possible configurations, the man skilled in the art can easily select the most appropriate or the most advantageous one according to the production methods adopted for building the tread band.

The first and second sectors 9, 10 are also alternatively axially distributed according to the positioning requirements of the longitudinal grooves 11 with a pitch p that can be variable or constant along the transversal development of the tread band 6.

Although the pneumatic tire 1 of this preferred embodiment has been illustrated with just one layer including the first and the second axially adjacent sectors 9, 10, this does not exclude that the tread band 6 can comprise two or more radially superposed layers in order to satisfy specific and contingent application requirements.

Moreover, the number and the extent of the transversal development of the first and second sectors 9, 10 of the tread band 6 can be different from those exemplified for illustrative and not limiting purposes in FIGS. 1 and 2 and can easily be determined by the man skilled in the art according to specific application requirements of the pneumatic tire 1.

Figure 3A:
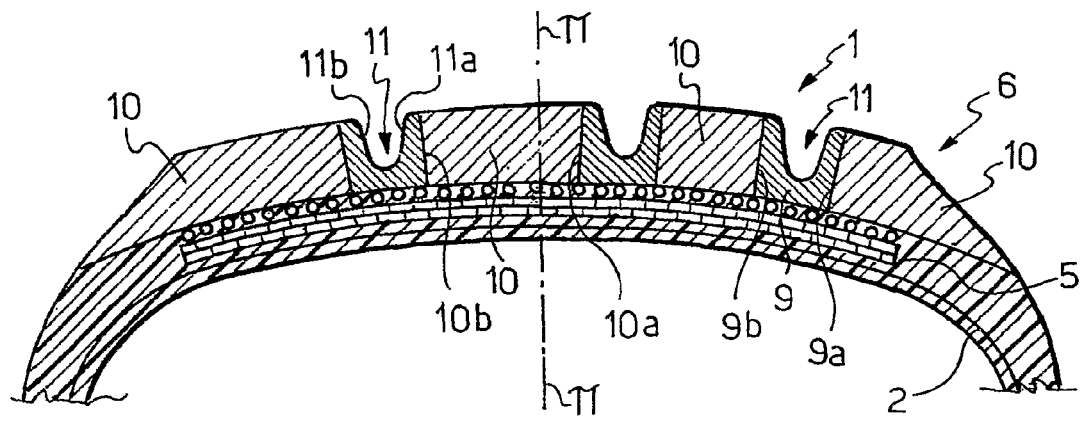
FIG. 3A shows an enlarged scale cross-section view of some details of a second embodiment of a pneumatic tire according to the present invention.
Figure 3B:
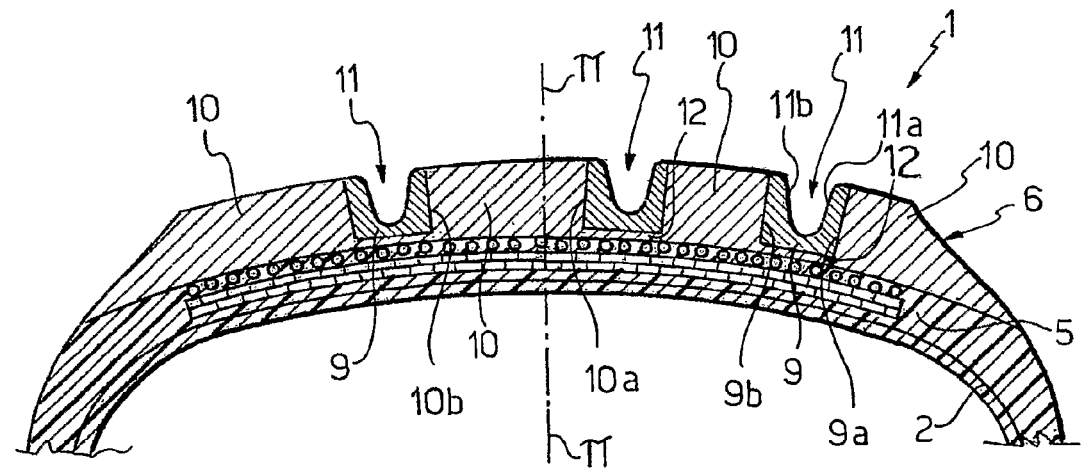
FIG. 3B shows an enlarged scale cross-section view of some details of a third embodiment of a pneumatic tire according to the present invention.

In FIGS. 3A and 3B two further preferred embodiments of the pneumatic tire 1 of the invention are illustrated.

In the following description and in such figures, the elements of the pneumatic tire 1 which are structurally or functionally equivalent to those previously illustrated with reference to the embodiment shown in FIGS. 1, 2 and 2A will be indicated with the same reference numerals and will not be described any further.

In the embodiment illustrated in FIG. 3A, the first and second sectors 9, 10 of the tread band 6 are radially extending substantially for the entire thickness of the tread band itself, achieving also in this case substantially the same overall technical effects of the pneumatic tire 1 illustrated in FIGS. 1, 2 and 2A.

In the embodiment illustrated in FIG. 3B, the second sectors 10 of the tread band 6 are integrally extending along a radially outer direction starting from a layer 12—preferably having a thickness comprised between 1 and 5 mm—interposed between the tread band 6 and the belt structure 5 and substantially consisting of the second elastomeric material.

Also in this case, substantially the same overall technical effects of the pneumatic tire 1 illustrated in FIGS. 1, 2 and 2A are achieved.

In the following example, provided for indicating and not limiting purposes, some formulations of preferred elastomeric materials which can be used for making the first and second sectors 9, 10 of the tread band 6 of a pneumatic tire according to the invention shall now be indicated.

EXAMPLE

Elastomeric materials have been prepared, designated with A and B in the following Table 1, which can be used for making the first and second sectors 9, 10 according to the present invention of the tread band 6. In Table 1, all of the amounts are expressed in phr.

TABLE 1

| Ingredients | material A (first sectors 9) | material B (second sectors 10) |
|---|---|---|
| E-SBR 1712 | 60 | 70 |
| E-SBR 1500 | — | 30 |
| NR SMR20 | 40 | — |
| carbon black N234 | 60 | 30 |
| SiO$_2$ | 35 | 35 |
| SiO$_2$ binding agent | 6 | 7 |
| aromatic oil | 5 | 10 |
| stearic acid | 1.5 | 1.5 |
| ZnO | 2.5 | 2.5 |
| 6PPD | 2 | 2 |
| DPG | 1 | 1 |
| TBBS | — | 1.5 |
| CBS | 2.0 | — |
| soluble sulfur | 4.5 | 1.3 |

The ingredients used were the following:
E-SBR 1712=butadiene-styrene copolymer prepared in emulsion commercially available with the trade name of KRYNOL®1712 (BAYER);
E-SBR 1500=butadiene-styrene copolymer prepared in emulsion commercially available with the trade name of KRYLENE®1500 (BAYER);
NR SMR20=natural rubber;
carbon black N234=a product available on the market with the trade name of VULCAN®7H (CABOT CORPORATION);
SiO$_2$=silica available on the market with the trade name of ULTRASIL® VN3 (DEGUSSA);
SiO$_2$ binding agent=solid composition including 50% carbon black (N330), 50% bis(3-triethoxysilyl-propyl)tetrasulfide commercially available with the trade name of X50S® (DEGUSSA);
aromatic oil=a product available on the market with the trade name of MOBILOIL®90 (MOBIL);
stearic acid=a product available on the market with the trade name of STEARINA®TP8 (MIRACHEM);
ZnO=a product available on the market with the trade name of ZINKOXYD AKTIV® (BAYER);
6PPD=N-1,3-dimethylbutyl-N'-phenyl-p-phenylendiamine available on the market with the trade name of VULCANOX®4020 (BAYER);
DPG=diphenylguanidine, available on the market with the trade name of VULKACIT®D (BAYER);
TBBS=N-t-butyl-2-benzothiazyl-sulfenamide, available on the market with the trade name of VULKACIT®NZ (BAYER);
CBS=N-cyclohexyl-2-benzothiazyl-sulfenamide, available on the market with the trade name of VULKACIT®CZ (BAYER);
soluble sulfur=a product available on the market with the trade name of RUBERSUL®400 (REPSOL DERIVADOS).

According to techniques conventional per se and known in the art, the aforementioned elastomeric materials were subjected to vulcanization and then to a series of tests having the purpose of measuring some typical parameters of the vulcanized materials. The parameters taken into consideration were the following:
E' 23° C.=modulus of elasticity under compression measured at 23° C. according to the procedure described hereinabove;
IRHD hardness=measured at 23° C. according to standard ISO 48;
CA 1=traction force (referred to the section of the test piece) to have a deformation of 100%, measured according to standard DIN 53504.

The results of the tests carried out are shown in the following Table 2.

TABLE 2

| Parameter | material A (first sectors 9) | material B (second sectors 10) |
|---|---|---|
| IRHD hardness | 91 | 70 |
| E' 23° C. [MPa] | 30.5 | 12.8 |
| CA 1 [MPa] | 7.5 | 2.3 |

Figure 4:
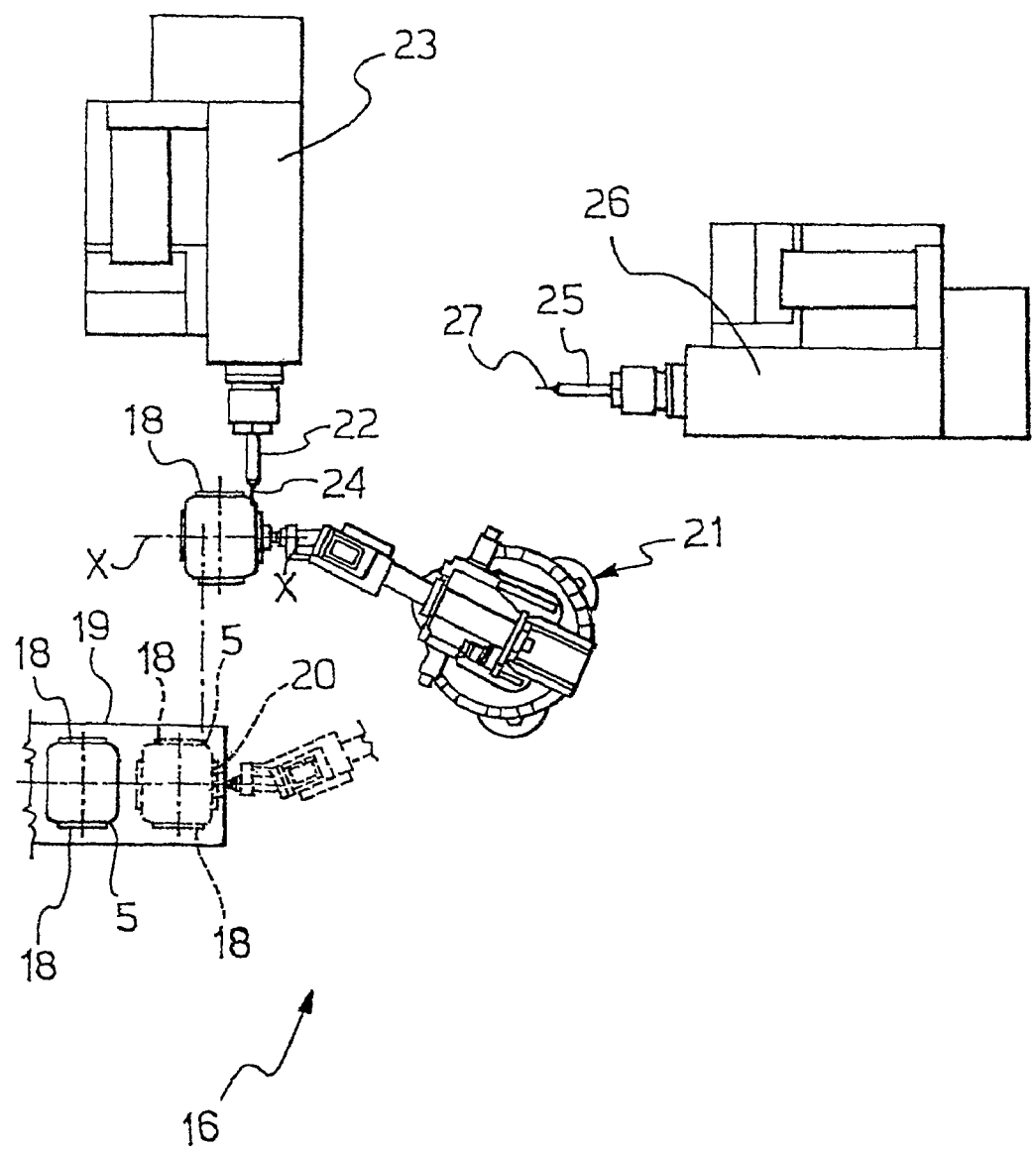
FIG. 4 shows a schematic plan view of a robotized station for assembling the tread band of the pneumatic tire according to the invention.
Figure 5:
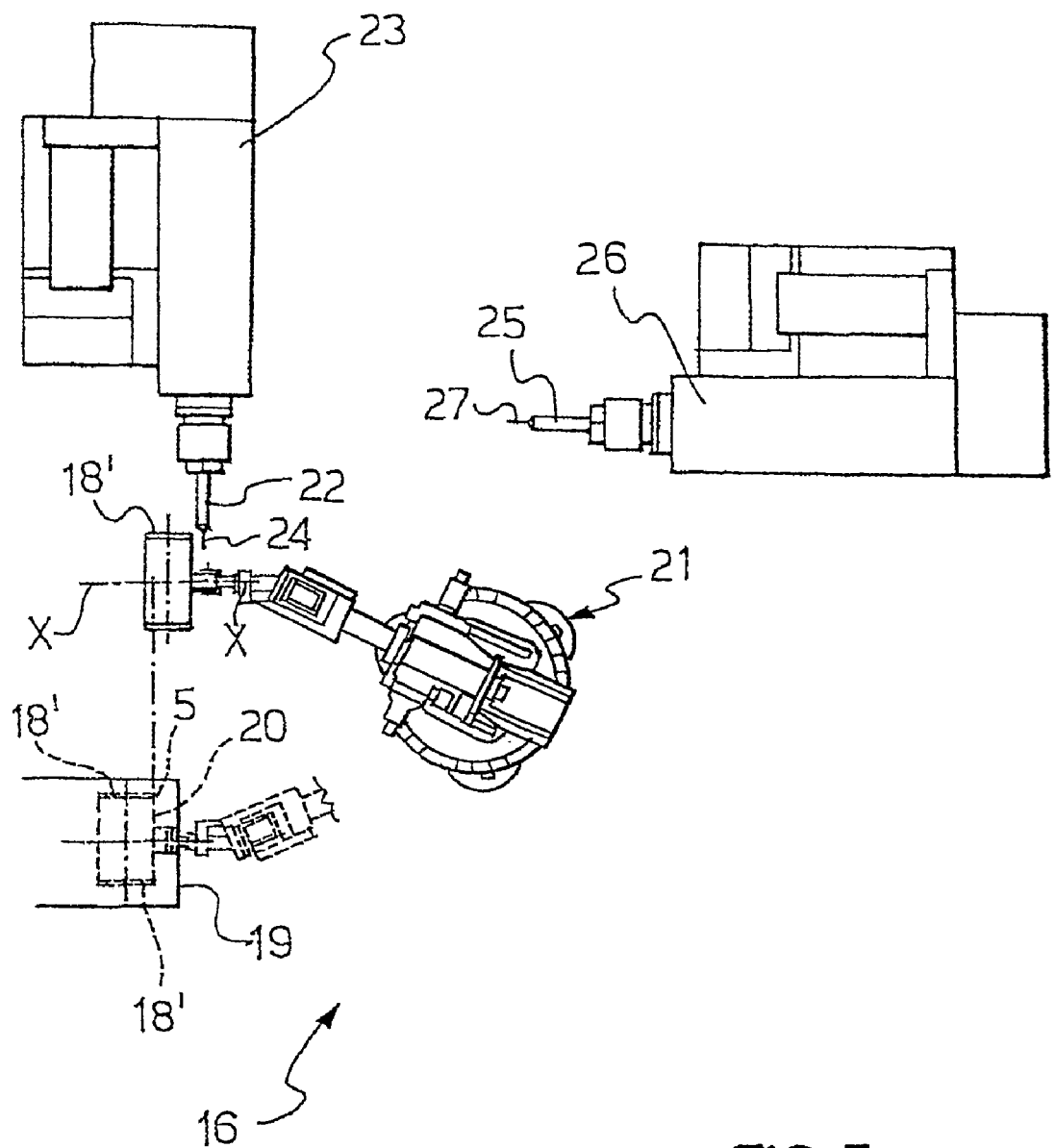
FIG. 5 shows a schematic plan view of a robotized station for assembling the tread band of the pneumatic tire according to the invention on a substantially cylindrical auxiliary drum.
Figure 6:
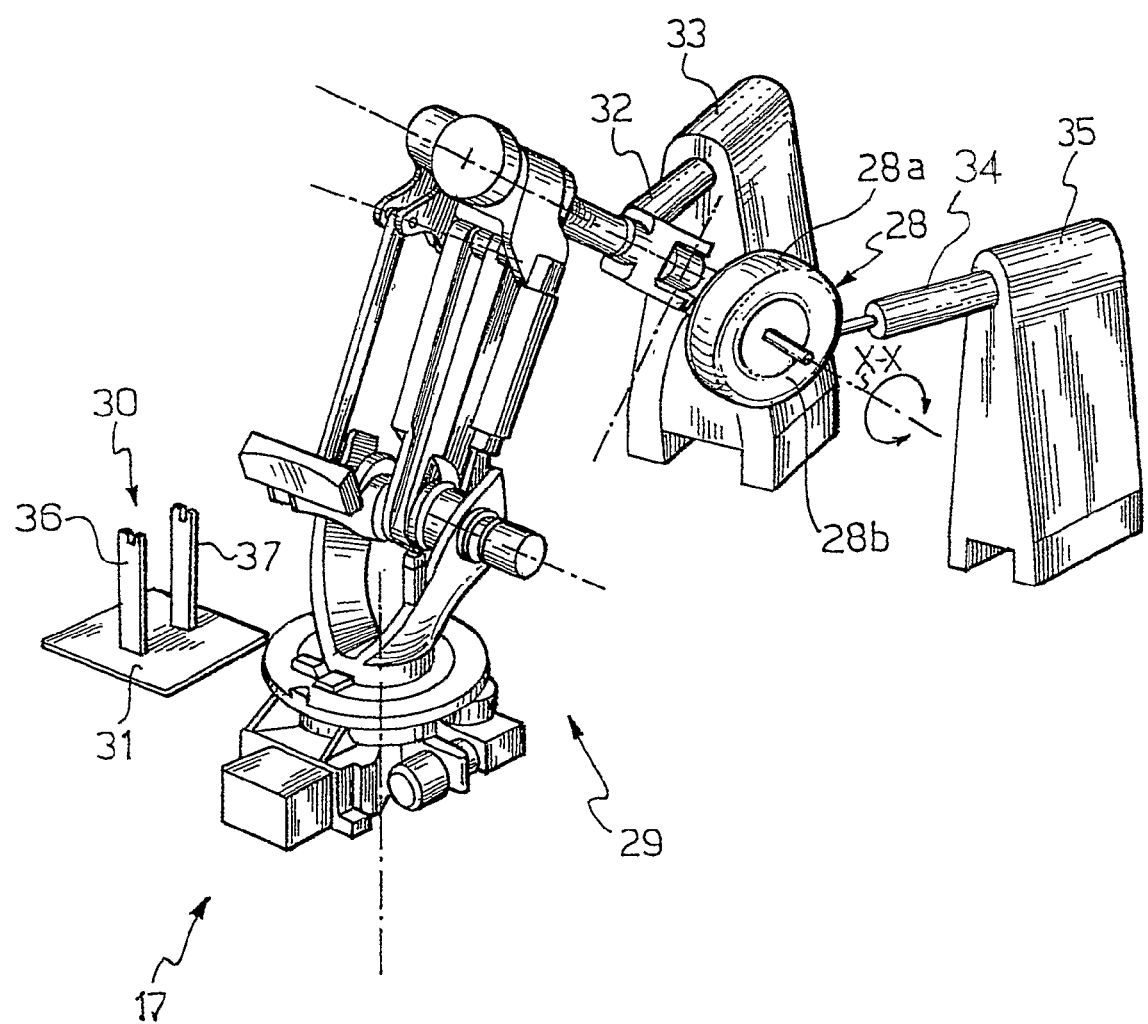
FIG. 6 shows a schematic perspective view of a robotized station for assembling the tread band of the pneumatic tire according to the invention on a substantially rigid toroidal support.

With reference to FIGS. 4, 5 and 6, respective work stations shall now be described, generally indicated at 16 in FIGS. 4 and 5 and indicated at 17 in FIG. 6, intended to make the tread band 6 with axially adjacent sectors of the pneumatic tire 1 within the framework of preferred embodiments of the building process according to the invention.

In the embodiment illustrated in FIG. 4, a robotized work station intended to assemble the tread band 6 of the pneumatic tire 1 illustrated in FIG. 3A is generally indicated at 16.

The work station 16 is associated to a conventional building plant for the production of pneumatic tires, or for carrying out part of the working operations foreseen in the production cycle of the pneumatic tires themselves, plant that is otherwise not illustrated being known per se.

In such a plant, apparatuses known per se and not illustrated are also present for assembling the carcass structure 2 and the annular reinforcing structure 3 associated thereto on a supporting element capable to assume a substantially toroidal configuration, such as for example a building drum 18 known per se, as well as for subsequently assembling the belt structure 5 at a radially outer position with respect to the carcass structure 2.

The work station 16 comprises a robotized arm known per se, generally indicated at 21 and preferably of the anthropomorphic type with seven axes, intended to pick up each drum 18 supporting the carcass structure 2, the annular reinforcing structure 3 and the belt structure 5 from a pick up position 20, defined at the end of a conveyor belt 19 or other suitable transporting means, to a delivery position of the sectors 9, 10 of the tread band 6.

More specifically, the delivery position of the first sectors 9 of the tread band 6 is defined at a first delivery member 22 of an extruder 23, adapted to provide at least one first continuous elongated element consisting of an elongated element 24 made of a suitable elastomeric material having a suitable size in cross-section, whereas the delivery position of the second sectors 10 of the tread band 6 is defined at a second delivery member 25 of an extruder 26, adapted to provide at least one second continuous elongated element consisting of an elongated element 27 also consisting of a suitable elastomeric material having a suitable size in cross section.

With reference to the work station 16 described above and to FIG. 4, a first preferred embodiment of the process for building a pneumatic tire of this invention shall now be described.

In a series of preliminary steps carried out upstream of the work station 16, the carcass structure 2 comprising the annular reinforcing structure 3 and the belt structure 5 are assembled and shaped on the drum 18 which assumes and then determines a substantially toroidal shape of the pneumatic tire under construction. Said drum 18 is then transported by the conveyor belt 19 to the pick up position 20.

In a subsequent step, the robotized arm 21 positions the drum 18 in the first delivery position defined at the first delivery member 22 of the elongated element 24 consisting of the first elastomeric material having after vulcanization a modulus of elasticity E' under compression at 23° C. comprised between about 20 and about 80 MPa and intended to form the first sectors 9 of the tread band 6.

In such a delivery position, the robotized arm 21 rotates the drum 18 about its rotation axis X-X and carries out a relative displacement between the delivery member 22 and the drum 18 by also imparting to the latter a translational movement along a direction substantially parallel to the aforementioned rotation axis X-X.

Simultaneously with the rotation and translation movement of the drum 18 the first delivery member 22 delivers the elongated element 24 at a radially outer position with respect to the belt layer 5 so as to form the first sectors 9 of the tread band 6 in which the longitudinal grooves shall subsequently be formed.

Advantageously, the rotation and translation movement of the drum 18 is suitably driven in such a way as to form a plurality of first sectors 9 axially spaced apart by the predetermined pitch p.

Preferably, the delivery of the elongated element 24 is carried out by forming a plurality of coils axially arranged side-by-side and/or radially superposed so as to define the first sectors 9.

In a subsequent step, the robotized arm 21 positions the drum 18 in the second delivery position defined at the second delivery member 25 of the elongated element 27 made of the second elastomeric material intended to form the second sectors 10 of the tread band 6 and having after vulcanization a value of the modulus of elasticity E' under compression at 23° C. lower than that of the first elastomeric material constituting the first sectors 9.

Also in this second delivery position, the robotized arm 21 rotates the auxiliary drum 18 about its rotation axis X-X and carries out a relative displacement between the delivery member 25 and the auxiliary drum 18 also imparting to the latter a translational movement along a direction substantially parallel to the aforementioned rotation axis X-X.

Simultaneously with the rotation and translation movement of the auxiliary drum 18, the second delivery member 25 delivers the elongated element 27 at a radially outer position with respect to the belt layer 5 so as to form the second sectors 10 of the tread band 6 between the first sectors 9 previously formed.

Also in this case, the rotation and translation movement of the drum 18 is suitably driven so as to form a plurality of second sectors 10 axially spaced apart by the predetermined pitch p.

Also in this step, the delivery of the elongated element 27 is preferably carried out by forming a plurality of coils axially arranged side-by-side and/or radially superposed.

At the end of this second deposition step, the tread band 6 of the green pneumatic tire being built may be deemed to be complete for which reason the drum 18 is transported in a way known per se and not shown to the subsequent work stations of the plant.

More specifically, a forming step of the longitudinal grooves 11 in the first sectors 9 and a vulcanization step of the pneumatic tire are then carried out in a way known per se in a work station, also conventional per se and not shown.

According to the invention, the deposition sequence of the sectors 9, 10 is not critical, for which reason it is also possible to foresee that the second sectors 10 are formed before the first sectors 9 at a radially outer position with respect to the belt layer 5.

In a variant of the previous embodiment of the process according to the invention, illustrated with reference to FIG. 5, a substantially cylindrical auxiliary drum 18' is used on which the belt structure 5 is assembled. The auxiliary drum 18' is substantially moved like the drum 18 previously illustrated.

More precisely, the auxiliary drum 18' is placed at the first delivery member 22 of the first elastomeric material; then, an elongated element 24 of said first elastomeric material is delivered by means of the delivery member 22 on the belt structure 5, preferably while carrying out a relative displacement between the first delivery member 22 and the auxiliary drum 18' so as to form the first sectors 9 of the tread band 6.

Subsequently, the auxiliary drum 18' is positioned at the second delivery member 25 of the second elastomeric material, and an elongated element 27 delivered by the member 25 is deposited on the belt structure 5, preferably while carrying out a relative displacement between the second delivery member 25 and the auxiliary drum 18' so as to form the second sectors 10 of the tread band 6 between the first sectors 9 previously formed.

Also in this embodiment, the steps of delivering the aforementioned elongated elements of elastomeric material are preferably carried out by rotating the auxiliary drum 18' about its rotation axis.

Similarly, the aforementioned delivering steps are carried out by forming a plurality of coils axially arranged side-by-side and/or radially superposed so as to define the first and second sectors 9, 10 of the tread band 6.

Preferably, finally, the relative displacement between the delivery members 22 and 25 and the auxiliary drum 18' is carried out by imparting to the auxiliary drum 18' a translational movement along a direction substantially parallel to its rotation axis.

Also in this case, the deposition sequence of the sectors 9, 10 is not critical, for which reason it is possible to foresee that the second sectors 10 are formed before the first sectors 9 at a radially outer position with respect to the belt layer 5.

At the end of the deposition of the tread band 6, the belt structure-tread band assembly is associated to the remaining parts of the pneumatic tire being built waiting on a different building drum.

These preferred embodiments of the process according to the invention have, in particular, an advantageous and effective application when it is desired to exploit a conventional production line, making use in fact of at least one building drum on which the semifinished products which shall constitute the pneumatic tire are at least partially formed, said conventional production line being integrated with a final robotized station for manufacturing the tread band with axially adjacent sectors described above.

In the embodiment illustrated in FIG. 6, a work station intended to manufacture the tread band 6 of the pneumatic tire 1 is generally indicated at 17.

The work station 17 is in particular associated to a highly automated plant for building pneumatic tires, or for carrying out part of the working operations foreseen in the production cycle of the pneumatic tires themselves, a plant otherwise not illustrated being known per se.

Within the framework of these working operations it is advantageously foreseen to build the different parts of the pneumatic tire 1 directly on a support 28, substantially toroidal and preferably substantially rigid, having an outer surface 28a, 28b substantially shaped according to the inner configuration of the pneumatic tire itself.

Within such a plant, robotized stations not illustrated herein are also present for building on the toroidal support 28 the carcass structure 2 comprising the annular reinforcing structure 3 and for the subsequent assembly of the belt structure 5 at a radially outer position with respect to the carcass structure 2.

The work station 17 comprises a robotized arm known per se, generally indicated at 29 and preferably of the anthropomorphic type with seven axes, intended to pick up each support 28 carrying the carcass structure 2, the annular reinforcing structure 3 and the belt structure 5 from a pick up position 30, defined at the end of two supporting arms 36, 37 of a trestle 31 or other suitable supporting means, to a delivery position of the sectors 9 and 10 of the tread band 6.

More specifically, the delivery position of the first sectors 9 of the tread band 6 is defined at a first delivery member 32 of an extruder 33, adapted to provide at least one first continuous elongated element consisting of an elongated element (not visible in FIG. 6) made of a suitable first elastomeric material having a suitable size in cross section, whereas the delivery position of the second sectors 10 of the tread band 6 is defined at a second delivery member 34 of an extruder 35, adapted to provide at least a second continuous elongated element consisting of an elongated element (also not visible in FIG. 6) consisting of a suitable second elastomeric material having a suitable size in cross section.

Further structural and functional details of the robotized arm 29 are for example described in International patent application WO 00/35666 in the name of the present Applicant, the description of which is herein incorporated by reference.

With reference to the work station 17 described above and to FIG. 6, a further preferred embodiment of the process for building a pneumatic tire of this invention shall now be described.

In a series of preliminary steps carried out upstream of the work station 17 in a series of robotized stations, the carcass structure 2, the annular reinforcing structure 3 and the belt structure 5 are built on the support 28 which is then transported to the pick up position 30.

In a subsequent step, the robotized arm 29 positions the support 28 in the first delivery position defined at the first delivery member 32 of the elongated member consisting of the first elastomeric material having after vulcanization a value of the modulus of elasticity E' under compression at 23° C. comprised between about 20 and about 80 MPa and intended to form the first sectors 9 of the tread band 6.

In such a delivery position, the robotized arm 29 rotates the support 28 about its rotation axis X-X and carries out a relative displacement between the delivery member 32 and the support 28 also imparting to the latter a translational movement along a direction substantially parallel to the aforementioned rotation axis X-X.

Simultaneously with the rotation and translation movement of the support 28 the first delivery member 32 delivers the elongated element at a radially outer position with respect to the belt layer 5 so as to form the first sectors 9 of the tread band 6.

Preferably, the delivery of the elongated element is carried out by forming a plurality of coils axially arranged side-by-side and/or radially superposed so as to define the first sectors 9.

In a subsequent step, the robotized arm 29 positions the support 28 in the second delivery position defined at the second delivery member 34 of the elongated element consisting of the second elastomeric material having after vulcanization a value of the modulus of elasticity E' under compression at 23° C. lower than that of the first elastomeric material constituting the first sectors 9.

Also in this second delivery position, the robotized arm 29 rotates the support 28 about its rotation axis X-X and carries out a relative displacement between the delivery member 34 and the support 28 also imparting to the latter a translational movement along a direction substantially parallel to the aforementioned rotation axis X-X.

Simultaneously with the rotation and translation movement of the support 28 the second delivery member 34 delivers the elongated element at a radially outer position with respect to the belt layer 5 so as to form the second sectors 10 of the tread band 6 between the first sectors 9 previously formed.

Also in this case, the delivery of the elongated element is preferably carried out by forming a plurality of coils axially arranged side-by-side and/or radially superposed.

Also in this case, the deposition sequence of the first and second sectors 9, 10 is not critical, for which reason it is possible to foresee that the second sectors 10 are formed before the first sectors 9 at a radially outer position with respect to the belt layer 5.

At the end of this second deposition step, the tread band 6 of the green pneumatic tire being built may be deemed to be complete for which reason the support 28 is transported, in a way known per se and not shown, to the subsequent work stations of the plant.

Similarly to what has been described earlier, the green pneumatic tire thus obtained is sent to the step of forming the longitudinal grooves 11 and of vulcanization.

This different preferred embodiment of the process according to the invention has in particular an advantageous and effective application when it is desired to use production techniques which allow to minimize or, possibly, eliminate the production and storage of the semifinished products, for example by adopting process solutions which allow to make the individual components by directly applying them on the pneumatic tire being manufactured according to a predetermined sequence by means of a plurality of robotized stations.

Should the pneumatic tire 1 be provided with a layer 12 of elastomeric material positioned between the tread band 6 and the belt structure 5, such as for example illustrated in FIGS. 1, 2, 2A and 3B, the building process also comprises the step of the depositing the aforementioned layer at a radially outer position with respect to the belt structure 5 before the depositing the first or second sectors 9, 10 of the tread band.

This additional delivery step shall advantageously be carried out at the first or second delivery position according to the type of material to be used to form the layer 12.

In an advantageous embodiment, it is possible to substantially abbreviate the building times by carrying out the deposition of the layer 12 simultaneously with the deposition of the first or second sectors 9, 10 of the tread band 6 when the sectors and the layer 12 consist of the same elastomeric material.

Repeated tests carried out by the Applicant have shown that that the pneumatic tires according to the invention fully achieve the object of improving draining capacity and road holding on wet ground.

The invention claimed is:

1. A pneumatic tire comprising a carcass structure having at least one carcass ply and at least one annular reinforcing structure associated with said carcass ply, a tread band made of an elastomeric material at a radially outer position with respect to said carcass structure, a belt structure interposed between said carcass structure and said tread band and a pair of axially opposite side walls on said carcass structure, the tread band comprising:
   i) at least one radially extending first sector substantially of a first elastomeric material;
   ii) a plurality of radially extending second sectors positioned at axially opposite sides of said at least one first sector and substantially of a second elastomeric material;
   iii) at least one longitudinal groove formed in said at least one first sector and extending substantially for the entire circumferential development of the tread band, the at least one longitudinal groove defining a cross section;
   wherein said first elastomeric material has a modulus of elasticity under compression at 23° C. greater than the modulus of elasticity under compression at 23° C. of said second elastomeric material,
   wherein the modulus of elasticity under compression at 23° C. of said first elastomeric material is 20 to 80 MPa, and
   wherein a ratio between an IRHD hardness at 23° C. of the first elastomeric material and an IRHD hardness at 23° C. of the second elastomeric material is 1.15 to 2.70 such that the cross section of the at least one longitudinal groove remains substantially constant when a radially outer surface of the tread band is in contact with the ground.

2. The pneumatic tire according to claim 1, wherein the modulus of elasticity under compression at 23° C. of said second elastomeric material is about 4 to about 15 MPa.

3. The pneumatic tire according to claim 1, wherein the ratio between the modulus of elasticity under compression at 23° C. of the first elastomeric material and the modulus of elasticity under compression at 23° C. of the second elastomeric material of the tread band is not lower than about 1.30.

4. The pneumatic tire according to claim 3, wherein the ratio between the modulus of elasticity under compression at 23° C. of the first elastomeric material and the modulus of elasticity under compression at 23° C. of the second elastomeric material is about 1.5 to about 20.

5. The pneumatic tire according to claim 4, wherein the ratio between the modulus of elasticity under compression at 23° C. of the first elastomeric material and the modulus of elasticity under compression at 23° C. of the second elastomeric material is about 2.3 to about 7.

6. The pneumatic tire according to claim 1, wherein the IRHD hardness at 23° C. of the first elastomeric material, measured according to standard ISO 48, is about 75 to about 95.

7. The pneumatic tire according to claim 1, wherein the IRHD hardness at 23° C. of the second elastomeric material, measured according to standard ISO 48, is about 35 to about 80.

8. The pneumatic tire according to claim 1, wherein the tread band is provided with a plurality of longitudinal grooves and wherein said grooves are formed in respective first sectors, radially extending and axially spaced apart, substantially of said first elastomeric material.

9. The pneumatic tire according to claim 1, wherein said at least one first sector is radially extending substantially for the entire thickness of the tread band.

10. The pneumatic tire according to claim 1, wherein an additional layer of elastomeric material is interposed between said tread band and said belt structure.

11. The pneumatic tire according to claim 10, wherein said layer is substantially of said first elastomeric material.

12. The pneumatic tire according to claim 10, wherein said additional layer is substantially of said second elastomeric material.

13. The pneumatic tire according to claim 10, wherein said layer has a thickness of 1 to 5 mm.

14. The pneumatic tire according to claim 1, wherein the width of said at least one first sector is at least equal to the width of said at least one longitudinal groove.

15. The pneumatic tire according to claim 14, wherein the difference between the width of said at least one first sector and the width of said at least one longitudinal groove is 4 to 10 mm.

16. The pneumatic tire according to claim 1, wherein said at least one longitudinal groove is positioned astride the median plane of said at least one first sector.

17. A process for building a pneumatic tire comprising the steps of:
   a) building a carcass structure having at least one carcass ply associated with at least one annular reinforcing structure;
   b) assembling a belt structure;
   c) arranging, at a radially outer position with respect to said belt structure, at least one radially extending first sector of a tread band, substantially of a first elastomeric material having, after vulcanization, a value of the modulus of elasticity under compression at 23° C. of 20 to 80 MPa, the at least one radially extending first sector defining a longitudinally extending groove having a cross section; and
   d) arranging, at a radially outer position with respect to said belt structure, a plurality of radially extending second sectors of the tread band, axially spaced apart and substantially of a second elastomeric material having, after vulcanization, a value of the modulus of elasticity under compression at 23° C. lower than the value of the modulus of elasticity under compression at 23° C. of said first elastomeric material;
   wherein said steps c) and d) are carried out in such a way that said second sectors are positioned at axially opposite sides of said at least one first sector, and
   wherein a ratio between an IRHD hardness at 23° C. of the first elastomeric material and an IRHD hardness at 23° C. of the second elastomeric material is 1.15 to 2.70 such that the cross section of the at least one longitudinal groove remains substantially constant when a radially outer surface of the tread band is in contact with the ground.

18. The process according to claim 17, wherein said belt structure is shaped on a substantially cylindrical auxiliary drum and wherein said steps c) and d) comprise the steps of:
   e) positioning said auxiliary drum at a first delivery member of the first elastomeric material;
   f) delivering by means of said first delivery member at least one elongated element made of said first elastomeric material at a radially outer position with respect to said belt structure while carrying out a relative displacement between the first delivery member and the auxiliary drum, so as to form said at least one first sector of the tread band;
   g) positioning the auxiliary drum at a second delivery member of the second elastomeric material; and
   h) delivering by means of said second delivery member at least one elongated element made of said second elastomeric material at a radially outer position with respect to said belt structure while carrying out a relative displacement between the second delivery member and the auxiliary drum so as to form said second sectors of the tread band axially spaced apart and positioned at opposite sides of said at least one first sector.

19. The process according to claim 18, wherein said steps f) and h) of delivering the elongated elements of said first and second elastomeric materials are carried out by rotating said auxiliary drum about its rotation axis.

20. The process according to claim 18, wherein the relative displacement between the delivery member and the auxiliary drum is carried out by imparting to the auxiliary drum a first translational movement along a direction substantially parallel to its rotation axis and/or a second translational movement along a direction substantially perpendicular to said axis.

21. The process according to claim 18, wherein said steps f) and h) of delivering the elongated elements of said first and second elastomeric materials are carried out by forming a plurality of coils axially arranged side-by-side and/or radially superposed to define said at least one first and said second sectors of the tread band.

22. The process according to claim 17, wherein said belt structure is assembled on a substantially toroidal support and wherein said steps c) and d) comprise the steps of:
   e') positioning said substantially toroidal support at a first delivery member of the first elastomeric material;
   f') delivering by means of said first delivery member at least one elongated element made of said first elastomeric material at a radially outer position with respect to said belt structure while carrying out a relative displacement between the first delivery member and the substantially toroidal support, so as to form said at least one first sector of the tread band;
   g') positioning the substantially toroidal support at a second delivery member of the second elastomeric material; and
   h') delivering by means of said second delivery member at least one elongated element made of said second elastomeric material at a radially outer position with respect to said belt structure while carrying out a relative displacement between the second delivery member and the substantially toroidal support, so as to form said second sectors of tread band axially spaced apart and positioned at axially opposite sides of said at least one first sector.

23. The process according to claim 22, wherein said steps f') and h') of delivering the elongated elements of said first and second elastomeric materials are carried out by rotating said substantially toroidal support about its rotation axis.

24. The process according to claim 22, wherein the relative displacement between the delivery member and the substantially toroidal support is carried out by imparting to the substantially toroidal support a first translational movement along a direction substantially parallel to its rotation axis and/or a second translational movement along a direction substantially perpendicular to said axis.

25. The process according to claim 22, wherein said steps f') and h') of delivering the elongated elements of said first and second elastomeric materials are carried out by forming a plurality of coils axially arranged side-by-side and/or radially superposed to define said at least one first and said second sectors of the tread band.

26. The process according to claim 22, wherein said substantially toroidal support is substantially rigid.

27. The process according to claim 17, further comprising the step of delivering, at a radially outer position with respect to said belt structure, at least one additional layer of elastomeric material before carrying out said step c) of delivering said at least one first sector.

28. The process according to claim 17, further comprising the step of delivering, at a radially outer position with respect to said belt structure, at least one additional layer of elastomeric material simultaneously with said step c) of delivering said at least one first sector.

29. The process according to claim 17, further comprising the step of delivering, at a radially outer position with respect to said belt structure, at least one additional layer of elastomeric material before carrying out said step d) of delivering said plurality of second sectors.

30. The process according to claim 17, further comprising the step of delivering, at a radially outer position with respect to said belt structure, at least one additional layer of elastomeric material simultaneously with said step d) of delivering said plurality of second sectors.

31. The process according to claim 27, wherein said layer is substantially of said first elastomeric material.

32. The process according to claim 27, wherein said layer is substantially of said second elastomeric material.

33. The pneumatic tire according to claim 1, wherein the modulus of elasticity under compression at 23° C. of said first elastomeric material is about 30 to about 80 MPa.

34. The process according to claim 17, wherein the modulus of elasticity under compression at 23° C. of said first elastomeric material is about 30 to about 80 MPa.

35. A pneumatic tire comprising a carcass structure having at least one carcass ply and at least one annular reinforcing structure associated with said carcass ply, a tread band made of an elastomeric material at a radially outer position with respect to said carcass structure, a belt structure interposed between said carcass structure and said tread band and a pair of axially opposite side walls on said carcass structure, the tread band comprising:
   i) at least one radially extending first sector substantially of a first elastomeric material;
   ii) a plurality of radially extending second sectors positioned at axially opposite sides of said at least one first sector and substantially of a second elastomeric material;
   iii) at least one longitudinal groove formed in said at least one first sector and extending substantially for the entire circumferential development of the tread band; and
   iv) an underlayer interposed between the tread band and the belt structure suitable for providing global rigidity to the tread, the underlayer being integral with the first sector and comprised substantially of the first elastomeric material;
wherein said first elastomeric material has a modulus of elasticity under compression at 23° C. greater than the modulus of elasticity under compression at 23° C. of said second elastomeric material, and
wherein the modulus of elasticity under compression at 23° C. of said first elastomeric material is 20 to 80 MPa.

36. The pneumatic tire according to claim 35, wherein the modulus of elasticity under compression at 23° C. of said second elastomeric material is about 4 to about 15 MPa.

37. The pneumatic tire according to claim 35, wherein the ratio between the modulus of elasticity under compression at 23° C. of the first elastomeric material and the modulus of elasticity under compression at 23° C. of the second elastomeric material of the tread band is not lower than about 1.30.

38. The pneumatic tire according to claim 37, wherein the ratio between the modulus of elasticity under compression at 23° C. of the first elastomeric material and the modulus of elasticity under compression at 23° C. of the second elastomeric material is about 1.5 to about 20.

39. The pneumatic tire according to claim 38, wherein the ratio between the modulus of elasticity under compression at 23° C. of the first elastomeric material and the modulus of elasticity under compression at 23° C. of the second elastomeric material is about 2.3 to about 7.

40. The pneumatic tire according to claim 35, wherein the IRHD hardness at 23° C. of the first elastomeric material, measured according to standard ISO 48, is about 75 to about 95.

41. The pneumatic tire according to claim 35, wherein the IRHD hardness at 23° C. of the second elastomeric material, measured according to standard ISO 48, is about 35 to about 80.

42. The pneumatic tire according to claim 35, wherein the tread band is provided with a plurality of longitudinal grooves and wherein said grooves are formed in respective first sectors, radially extending and axially spaced apart, substantially of said first elastomeric material.

43. The pneumatic tire according to claim 35, wherein said layer has a thickness of 1 to 5 mm.

44. The pneumatic tire according to claim 35, wherein the width of said at least one first sector is at least equal to the width of said at least one longitudinal groove.

45. The pneumatic tire according to claim 44, wherein the difference between the width of said at least one first sector and the width of said at least one longitudinal groove is 4 to 10 mm.

46. The pneumatic tire according to claim 35, wherein said at least one longitudinal groove is positioned astride the median plane of said at least one first sector.

47. A process for building a pneumatic tire comprising the steps of:
a) building a carcass structure having at least one carcass ply associated with at least one annular reinforcing structure;
b) assembling a belt structure;
c) arranging, at a radially outer position with respect to said belt structure, at least one radially extending first sector of a tread band, substantially of a first elastomeric material having, after vulcanization, a value of the modulus of elasticity under compression at 23° C. of 20 to 80 MPa;
d) arranging, at a radially outer position with respect to said belt structure, a plurality of radially extending second sectors of the tread band, axially spaced apart and substantially of a second elastomeric material having, after vulcanization, a value of the modulus of elasticity under compression at 23° C. lower than the value of the modulus of elasticity under compression at 23° C. of said first elastomeric material; and
e) arranging, at a radially outer position with respect to said belt structure and a radially inner position with respect to said first and second sectors, an underlayer suitable for providing global rigidity to the tread band, the underlayer being integral with the first sector and comprised substantially of the first elastomeric material;
wherein said steps c) and d) are carried out in such a way that said second sectors are positioned at axially opposite sides of said at least one first sector.

48. The process according to claim 47, wherein said belt structure is shaped on a substantially cylindrical auxiliary drum and wherein said steps c) and d) comprise the steps of:
f) positioning said auxiliary drum at a first delivery member of the first elastomeric material;
g) delivering by means of said first delivery member at least one elongated element made of said first elastomeric material at a radially outer position with respect to said belt structure while carrying out a relative displacement between the first delivery member and the auxiliary drum, so as to form said at least one first sector of the tread band;
h) positioning the auxiliary drum at a second delivery member of the second elastomeric material; and
i) delivering by means of said second delivery member at least one elongated element made of said second elastomeric material at a radially outer position with respect to said belt structure while carrying out a relative displacement between the second delivery member and the auxiliary drum so as to form said second sectors of the tread band axially spaced apart and positioned at opposite sides of said at least one first sector.

49. The process according to claim 48, wherein said steps g) and i) of delivering the elongated elements of said first and second elastomeric materials are carried out by rotating said auxiliary drum about its rotation axis.

50. The process according to claim 48, wherein the relative displacement between the delivery member and the auxiliary drum is carried out by imparting to the auxiliary drum a first translational movement along a direction substantially parallel to its rotation axis and/or a second translational movement along a direction substantially perpendicular to said axis.

51. The process according to claim 48, wherein said steps g) and i) of delivering the elongated elements of said first and second elastomeric materials are carried out by forming a plurality of coils axially arranged side-by-side and/or radially superposed to define said at least one first and said second sectors of the tread band.

52. The process according to claim 47, wherein said belt structure is assembled on a substantially toroidal support and wherein said steps c) and d) comprise the steps of:
e') positioning said substantially toroidal support at a first delivery member of the first elastomeric material;
f') delivering by means of said first delivery member at least one elongated element made of said first elastomeric material at a radially outer position with respect to said belt structure while carrying out a relative displacement between the first delivery member and the substantially toroidal support, so as to form said at least one first sector of the tread band;
g') positioning the substantially toroidal support at a second delivery member of the second elastomeric material; and h') delivering by means of said second delivery member at least one elongated element made of said second elastomeric material at a radially outer position with respect to said belt structure while carrying out a relative displacement between the second delivery member and the substantially toroidal support, so as to form said second sectors of tread band axially spaced apart and positioned at axially opposite sides of said at least one first sector.

53. The process according to claim 52, wherein said steps f') and h') of delivering the elongated elements of said first and second elastomeric materials are carried out by rotating said substantially toroidal support about its rotation axis.

54. The process according to claim 52, wherein the relative displacement between the delivery member and the substantially toroidal support is carried out by imparting to the substantially toroidal support a first translational movement along a direction substantially parallel to its rotation axis and/or a second translational movement along a direction substantially perpendicular to said axis.

55. The process according to claim 52, wherein said steps f') and h') of delivering the elongated elements of said first and second elastomeric materials are carried out by forming a plurality of coils axially arranged side-by-side and/or radially superposed to define said at least one first and said second sectors of the tread band.

56. The process according to claim 52, wherein said substantially toroidal support is substantially rigid.

57. The process according to claim 47, wherein the underlayer has a thickness of 1 to 5 mm.

58. A pneumatic tire comprising a carcass structure having at least one carcass ply and at least one annular reinforcing structure associated with said carcass ply, a tread band made of an elastomeric material at a radially outer position with respect to said carcass structure, a belt structure interposed between said carcass structure and said tread band and a pair of axially opposite side walls on said carcass structure, the tread band comprising:
  i) at least one radially extending first sector substantially of a first elastomeric material;
  ii) a plurality of radially extending second sectors positioned at axially opposite sides of said at least one first sector and substantially of a second elastomeric material;
  iii) at least one longitudinal groove formed in said at least one first sector and extending substantially for the entire circumferential development of the tread band, the at least one longitudinal groove defining a cross section; and
  iv) an underlayer interposed between the tread band and the belt structure suitable for providing global rigidity to the tread, the underlayer being integral with the first sector and comprised substantially of the first elastomeric material;
  wherein said first elastomeric material has a modulus of elasticity under compression at 23° C. greater than the modulus of elasticity under compression at 23° C. of said second elastomeric material,
  wherein the modulus of elasticity under compression at 23° C. of said first elastomeric material is 20 to 80 MPa, and
  wherein a ratio between an IRHD hardness at 23° C. of the first elastomeric material and an IRHD hardness at 23° C. of the second elastomeric material is 1.15 to 2.70 such that the cross section of the at least one longitudinal groove remains substantially constant when a radially outer surface of the tread band is in contact with the ground.

59. The pneumatic tire according to claim 58, wherein the modulus of elasticity under compression at 23° C. of said second elastomeric material is about 4 to about 15 MPa.

60. The pneumatic tire according to claim 58, wherein the ratio between the modulus of elasticity under compression at 23° C. of the first elastomeric material and the modulus of elasticity under compression at 23° C. of the second elastomeric material of the tread band is not lower than about 1.30.

61. The pneumatic tire according to claim 60, wherein the ratio between the modulus of elasticity under compression at 23° C. of the first elastomeric material and the modulus of elasticity under compression at 23° C. of the second elastomeric material is about 1.5 to about 20.

62. The pneumatic tire according to claim 61, wherein the ratio between the modulus of elasticity under compression at 23° C. of the first elastomeric material and the modulus of elasticity under compression at 23° C. of the second elastomeric material is about 2.3 to about 7.

63. The pneumatic tire according to claim 58, wherein the IRHD hardness at 23° C. of the first elastomeric material, measured according to standard ISO 48, is about 75 to about 95.

64. The pneumatic tire according to claim 58, wherein the IRHD hardness at 23° C. of the second elastomeric material, measured according to standard ISO 48, is about 35 to about 80.

65. The pneumatic tire according to claim 58, wherein the tread band is provided with a plurality of longitudinal grooves and wherein said grooves are formed in respective first sectors, radially extending and axially spaced apart, substantially of said first elastomeric material.

66. The pneumatic tire according to claim 58, wherein said layer has a thickness of 1 to 5 mm.

67. The pneumatic tire according to claim 58, wherein the width of said at least one first sector is at least equal to the width of said at least one longitudinal groove.

68. The pneumatic tire according to claim 67, wherein the difference between the width of said at least one first sector and the width of said at least one longitudinal groove is 4 to 10 mm.

69. The pneumatic tire according to claim 58, wherein said at least one longitudinal groove is positioned astride the median plane of said at least one first sector.

70. A process for building a pneumatic tire comprising the steps of:
  a) building a carcass structure having at least one carcass ply associated with at least one annular reinforcing structure;
  b) assembling a belt structure;
  c) arranging, at a radially outer position with respect to said belt structure, at least one radially extending first sector of a tread band, substantially of a first elastomeric material having, after vulcanization, a value of the modulus of elasticity under compression at 23° C. of 20 to 80 MPa, the at least one radially extending first sector defining a longitudinal groove having a cross section;
  d) arranging, at a radially outer position with respect to said belt structure, a plurality of radially extending second sectors of the tread band, axially spaced apart and substantially of a second elastomeric material having, after vulcanization, a value of the modulus of elasticity under compression at 23° C. lower than the value of the modulus of elasticity under compression at 23° C. of said first elastomeric material; and
  e) arranging, at a radially outer position with respect to said belt structure and a radially inner position with respect to said first and second sectors, an underlayer suitable for providing global rigidity to the tread band, the underlayer being integral with the first sector and comprised substantially of the first elastomeric material;

wherein said steps c) and d) are carried out in such a way that said second sectors are positioned at axially opposite sides of said at least one first sector, and wherein a ratio between an IRHD hardness at 23° C. of the first elastomeric material and an IRHD hardness at 23° C. of the second elastomeric material is 1.15 to 2.70 such that the cross section of the at least one longitudinal groove remains substantially constant when a radially outer surface of the tread band is in contact with the ground.

71. The process according to claim 70, wherein said belt structure is shaped on a substantially cylindrical auxiliary drum and wherein said steps c) and d) comprise the steps of:
  f) positioning said auxiliary drum at a first delivery member of the first elastomeric material;
  g) delivering by means of said first delivery member at least one elongated element made of said first elastomeric material at a radially outer position with respect to said belt structure while carrying out a relative displacement between the first delivery member and the auxiliary drum, so as to form said at least one first sector of the tread band;
  h) positioning the auxiliary drum at a second delivery member of the second elastomeric material; and
  i) delivering by means of said second delivery member at least one elongated element made of said second elastomeric material at a radially outer position with respect to said belt structure while carrying out a relative displacement between the second delivery member and the auxiliary drum so as to form said second sectors of the tread band axially spaced apart and positioned at opposite sides of said at least one first sector.

72. The process according to claim 71, wherein said steps g) and i) of delivering the elongated elements of said first and second elastomeric materials are carried out by rotating said auxiliary drum about its rotation axis.

73. The process according to claim 71, wherein the relative displacement between the delivery member and the auxiliary drum is carried out by imparting to the auxiliary drum a first translational movement along a direction substantially parallel to its rotation axis and/or a second translational movement along a direction substantially perpendicular to said axis.

74. The process according to claim 71, wherein said steps g) and i) of delivering the elongated elements of said first and second elastomeric materials are carried out by forming a plurality of coils axially arranged side-by-side and/or radially superposed to define said at least one first and said second sectors of the tread band.

75. The process according to claim 70, wherein said belt structure is assembled on a substantially toroidal support and wherein said steps c) and d) comprise the steps of:
  e') positioning said substantially toroidal support at a first delivery member of the first elastomeric material;
  f') delivering by means of said first delivery member at least one elongated element made of said first elastomeric material at a radially outer position with respect to said belt structure while carrying out a relative displacement between the first delivery member and the substantially toroidal support, so as to form said at least one first sector of the tread band;
  g') positioning the substantially toroidal support at a second delivery member of the second elastomeric material; and
  h') delivering by means of said second delivery member at least one elongated element made of said second elastomeric material at a radially outer position with respect to said belt structure while carrying out a relative displacement between the second delivery member and the substantially toroidal support, so as to form said second sectors of tread band axially spaced apart and positioned at axially opposite sides of said at least one first sector.

76. The process according to claim 75, wherein said steps f') and h') of delivering the elongated elements of said first and second elastomeric materials are carried out by rotating said substantially toroidal support about its rotation axis.

77. The process according to claim 75, wherein the relative displacement between the delivery member and the substantially toroidal support is carried out by imparting to the substantially toroidal support a first translational movement along a direction substantially parallel to its rotation axis and/or a second translational movement along a direction substantially perpendicular to said axis.

78. The process according to claim 75, wherein said steps f') and h') of delivering the elongated elements of said first and second elastomeric materials are carried out by forming a plurality of coils axially arranged side-by-side and/or radially superposed to define said at least one first and said second sectors of the tread band.

79. The process according to claim 75, wherein said substantially toroidal support is substantially rigid.

80. The process according to claim 70, wherein the underlayer has a thickness of 1 to 5 mm.

* * * * *